United States Patent [19]

Guggenheim et al.

[11] Patent Number: 4,868,279

[45] Date of Patent: Sep. 19, 1989

[54] SPIRO(BIS) INDANE COPOLYAMIDE AND PREPARATION THEREOF

[75] Inventors: Thomas L. Guggenheim; Sharon J. McCormick, both of Scotia; Alice M. Colley, Latham, all of N.Y.; Joseph W. Guiles, Ft. Collins, Colo.

[73] Assignee: General Electric Company, Schenectady, N.Y.

[21] Appl. No.: 156,126

[22] Filed: Feb. 16, 1988

Related U.S. Application Data

[63] Continuation-in-part of Ser. No. 20,264, Feb. 27, 1987, Continuation-in-part of Ser. No. 146,154, Jan. 20, 1988.

[51] Int. Cl.$^4$ ............................................. C08G 69/14
[52] U.S. Cl. .................................. 528/324; 528/206; 528/208; 528/210; 528/211; 528/323; 528/344
[58] Field of Search ............... 528/324, 323, 344, 206, 528/208, 210, 211

[56] References Cited

U.S. PATENT DOCUMENTS 3,725,070  4/1973  Hamb et al. ...................... 96/87 R Primary Examiner—Harold D. Anderson
Attorney, Agent, or Firm—William H. Pittman; James C. Davis, Jr.

[57] ABSTRACT

Copolyamides are prepared by the reaction of monocyclic spiro(bis)indane polyamide oligomers with lactams in the presence of basic reagents.

18 Claims, No Drawings

SPIRO(BIS) INDANE COPOLYAMIDE AND PREPARATION THEREOF

This application is a continuation-in-part of copending applications Ser. No. 20,264, filed Feb. 27, 1987, and Ser. No. 146,154, filed Jan. 20, 1988.

This invention relates to spirobiindane copolymers, and more particularly to spirobiindane copolyamides and a method for their preparation.

Polyamides are a valuable class of resinous materials useful in many areas including fiber formation, molding and formation of blends with other polymers. Particularly useful properties of polyamides are high tensile strength and solvent resistance. For the most part, polyamides are prepared either by the reaction of diamines with dicarboxylic acids or their derivatives or by ring-opening polymerization of lactams.

A recent innovation in the preparation of certain linear polymers involves the use of cyclic oligomer compositions as intermediates. For example, cyclic polycarbonate oligomer mixtures, disclosed in U.S. Pat. No. 4,644,053, are readily convertible under very favorable conditions to linear polycarbonates of very high molecular weight. The present invention provides a class of novel copolyamides, and an analogous method for their preparation from cyclic polyamides.

In one of its aspects, the present invention includes linear spirobiindane copolyamides comprising spiro(bis)indane amide structural units and structural units of the formula $$-R^1-\overset{O}{\underset{\|}{C}}-NH-, \quad (I)$$

wherein $R^1$ is a unsubstituted or substituted alkylene radical containing a chain of about 2–20 carbon atoms.

The $R^1$ radicals are preferably straight alkylene chains containing about 4–12 carbon atoms. They may be considered as being derived from lactams such as pivalolactam, δ-valerolactam, ε-caprolactam and laurolactam, in which $R^1$ is $CH_2(CH_3)_2$, $(CH_2)_4$, $(CH_2)_5$ and $(CH_2)_{11}$, respectively. ε-Caprolactam is especially preferred.

The spirobiindane amide structural units are characterized by the presence of an A radical having the formula

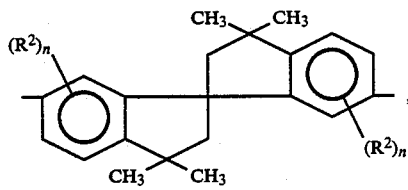

wherein each $R^2$ is independently $C_{1-4}$ primary or secondary alkyl or halo and n is 0–3. Such A radicals are obviously derived from 6,6'-difunctional 3,3,3',3'-tetramethylspiro(bis)indanes (hereinafter sometimes simply "spirobiindanes"), which may be substituted or unsubstituted. The $R^2$ values therein may be alkyl radicals such as methyl, ethyl, 1-propyl or 2-propyl, or halo atoms such as chloro or bromo. Among compounds containing such $R^2$ values, methyl and chloro are preferred; however, the most preferred compounds are the unsubstituted 6,6'-difunctional 3,3,3',3'-tetramethylspiro(bis)indanes, in which n is 0.

Any type of linkage may connect the A radical with the amide portions of the spirobiindane structural unit. Examples are single bonds, imide linkages (as present, for example in cyclic polyamideimides), ether linkages, unsubstituted or substituted alkylene and arylene linkages, and combinations thereof.

The spirobiindane structural units which are often preferred are those having the formula

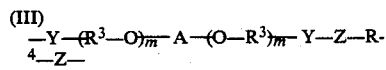

wherein:
A is as previously defined;
each of $R^3$ and $R^4$ is independently an unsubstituted or substituted alkylene or arylene radical other than o-arylene;
Z is

and Z is NH, or Y is NH and Z is

and
m is 0 or 1.

The $R^3$ radicals may be alkylene or arylene and are most often unsubstituted m- or p-phenylene. The value of m may be 0 or 1; that is, the $-O-R^3-$ moiety may be present or absent.

The $R^4$ values may also be alkylene or arylene. The alkylene radicals generally contain about 2–8 carbon atoms, about 2–4 thereof usually being in a straight chain. They are illustrated by ethylene, trimethylene and tetramethylene, as well as branched isomers thereof. The arylene radicals, which are frequently preferred, generally contain about 6–25 carbon atoms and are illustrated by m-phenylene, p-phenylene, the corresponding tolylene radicals, 4,4'-biphenylene, 1,4-naphthylene, 1,8-naphthylene and phenylindanol-derived radicals of the formula

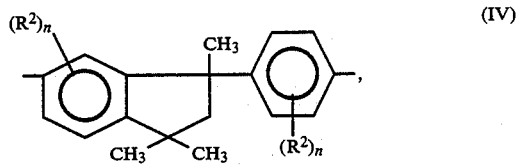

wherein $R^2$ and n are as previously defined. The arylene hydrocarbon radicals, especially m-phenylene, are most preferred.

Any substituent which does not undergo interfering reactions in the context of this invention may be present on the $R^3$ and/or $R^4$ radicals Illustrative substituents are halo, nitro and alkoxy.

From the definitions hereinabove of Y and Z, it will be apparent that the preferred copolyamides of this invention may be derived from spirobiindane diamines and other dicarboxylic acids, or from spirobiindane dicarboxylic acids and other diamines. They may be prepared by effecting reaction between at least one lactam of the formula

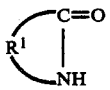  (V)

and a composition comprising macrocyclic polyamide oligomers of the formula

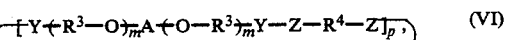  (VI)

wherein $R^{3-4}$, A and m are as previously defined and p is from 1 to about 15, in the presence of a basic reagent. This method of preparation is another aspect of the invention.

For the most part, said macrocyclic polyamide oligomer compositions are mixtures of oligomers having varying degrees of polymerization. However, it is frequently possible to isolate individual oligomers, particularly the cyclic "monomer", by conventional means such as preparative scale high pressure liquid chromatography. Higher oligomer species are hereinafter sometimes identified as "dimer", etc.

Said oligomer compositions may be prepared from the corresponding diamines and dicarboxylic acid chlorides, as described hereinafter. The diamines in which $R^3$ is m- or p-phenylene and p is 1, and corresponding nitro compounds, are novel compounds; they are disclosed and claimed in the aforementioned application Ser. No. 20,264.

The nitro compounds (hereinafter sometimes "bisnitrophenoxy ethers") may be prepared by the reaction of halonitrobenzenes or dinitrobenzenes with spirobiindane bisphenol salts under alkaline conditions in a dipolar aprotic solvent. The molar ratio of nitro compound to spirobiindane bisphenol salt is generally about 2.0–2.5:1. The corresponding bis-aminophenoxy ethers may be prepared by reduction of said bis-nitrophenoxy ethers by conventional means such as catalytic hydrogenation.

The preparation of the bis-nitrophenoxy and bis-aminophenoxy ethers is illustrated by the following examples.

Example 1

A reaction vessel fitted with a mechanical stirrer, reflux condenser and nitrogen purge means was charged with 45.9 grams (149 mmol.) of SBI, 49.31 grams (313 mmol.) of p-chloronitrobenzene, 61.68 grams (447 mmol.) of potassium carbonate and 700 ml. of dry dimethylformamide. The mixture was purged with nitrogen and heated at 150° C. with stirring for 14 hours. It was then poured into 1.5 liters of ice water with rapid stirring, and the precipitated 6,6'-bis(4-nitrophenoxy)-3,3,3',3'-tetramethyl-1,1'-spiro(bis)indane was recrystallized from methyl ethyl ketone. The yield was 73.7 grams (90% of theoretical) of a crystalline product, m.p. 200.5°–201.5° C. The structure was confirmed by elemental analysis.

EXAMPLE 2

A mixture of 5.27 grams (9.58 mmol.) of the product of Example 1, 100 mg. of platinum oxide and 100 ml. of tetrahydrofuran was pressurized with hydrogen at 50 psi. and shaken for 3 hours at room temperature. The mixture was filtered, using a filter aid material, and the filtration residue was washed with methylene chloride. The combined filtrates were vacuum stripped to yield 4.6 grams (98% of theoretical) of 6,6'-(4-aminophenoxy)-3,3,3',3'-tetramethyl-1,1'-spiro(bis)indane, which was recrystallized from toluene to yield the pure product as fine crystals, m.p. 214°–215° C. The structure was confirmed by elemental analysis.

EXAMPLE 3

In a reaction vessel similar to that of Example 1, a mixture of 24.51 grams (79.6 mmol.) of SBI, 27.40 grams (163.1 mmol.) of m-dinitrobenzene, 43.93 grams (318.4 mmol.) of potassium carbonate and 175 ml. of dimethyl sulfoxide was heated for 30 hours at 140° C., under nitrogen. The mixture was cooled and diluted with 500 ml. of methylene chloride, and was washed with 10% aqueous sodium hydroxide solution, water and aqueous sodium chloride solution. The organic phase was filtered and the filtration residue was rinsed with methylene chloride. The combined filtrates were vacuum stripped to yield 42.5 grams of the product as a thick oil. A portion of the oil was purified by medium pressure liquid chromatography of an ethyl acetate-hexane solution over silica gel. The purified 6,6'-(3-nitrophenoxy)-3,3,3',3'-tetramethyl-1,1'-spiro(bis)indane was obtained in 66% yield, m.p. 174°–175° C. The structure was confirmed by elemental analysis.

EXAMPLE 4

Following the procedure of Example 2, 2.5 grams (4.5 mmol.) of the product of Example 3 was hydrogenated over a platinum oxide catalyst. Upon solvent removal and recrystallization from a toluene-cyclohexane mixture, there was obtained 1.8 grams (80% of theoretical) of analytically pure 6,6'-(3-aminophenoxy)-3,3,3',3'-tetramethyl-1,1'-spiro(bis)indane, m.p. 190°–97° C. with decomposition. The structure was confirmed analysis.

Tetracarboxylic acids of the formula

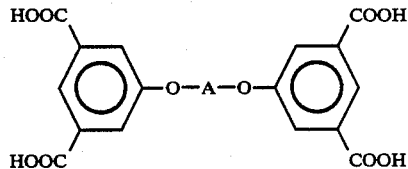

and their functional derivatives are useful intermediates for the preparation of macrocyclic polyamideimides which may also be used to prepare copolyamides of the invention. They are novel compounds and are disclosed and claimed in copending, commonly owned application Ser. No. 146,155, filed Jan. 20, 1988. The bisimides may be prepared by the reaction of the corresponding spirobiindane bisphenols with nitro-N-alkylphthalimides and converted to dianhydrides by methods similar to those employed to prepare the corresponding bisphenol. A reaction products. The following example is illustrative.

EXAMPLE 5

SBI, 15.4 grams (50 mmol.), was added portionwise to a slurry of 262 grams (102 mmol.) of sodium hydride in 100 ml. of dry dimethylformamide. The mixture was heated for one hour at 75° C. in a nitrogen atmosphere, after which 20.6 grams (100 mmol.) of 4-nitro-N-methylphthalimide was added. The resulting mixture was heated for 1½ hours at 110° C., cooled and poured into 3 volumes of cold water. The solid which precipitated was filtered and suspended in a mixture of toluene and 2% aqueous sodium hydroxide solution and the mixture was cooled and filtered; the organic phase of the filtrate was dried and vacuum stripped. The combined solids were the desired 6,6'-bis(3,4-dicarboxyphenoxy)- 3,3,3',3'-tetramethylspiro(bis)indane bis-N-methylimide (27.07 grams, 86.5% of theoretical). Its melting point after recrystallization from toluene was 217.5°–218° C. The structure was confirmed by proton nuclear magnetic resonance and field desorption mass spectrometry.

A solution of 14 grams (22.36 mmol.) of the bisimide in 16.7 grams of a 45% aqueous potassium hydroxide solution and 20 ml. of water was heated under reflux, with water and methylamine being removed by distillation and water being replenished. Heating was continued for 4 days, until the distillate was neutral to pH paper. The solution was cooled and added slowly to cold concentrated hydrochloric acid, and the tetracarboxylic acid which precipitated was collected by filtration, dried and dissolved in a mixture of 25 ml. of chlorobenzene and 5 ml. of acetic anhydride. Upon heating under reflux for 2½ hours and cooling, the desired dianhydride (10.3 grams, 77% of theoretical) precipitated and was filtered and dried; it melted at 233°–234° C. The structure was confirmed spectroscopically as for the bisimide.

The macrocyclic polyamide oligomer compositions may be prepared by gradually adding the dicarboxylic acid chloride to a solution in a substantially inert organic liquid of the diamine, at a temperature effective to achieve reaction, said acid chloride and diamine being employed in a molar ratio in the range of about 0.8–1.25:1.

Among the suitable intermediates for the polyamide oligomers are the 6,6'-diamino- and 6,6'-dicarboxy-3,3,3',3'-tetramethyl-bis-1,1'-spiroindanes. Said compounds are known in the art and may be prepared, for example, by oxidation of the corresponding 6,6'-dimethyl compounds to dicarboxylic acids followed, for diamine preparation, by treatment with sodium azide and sulfuric acid (i.e., the Schmidt reaction), as described in Curtis et al., *J. Chem. Soc.*, 1962, 418–421.

Any organic liquid which is substantially inert to the diamines and acid chlorides employed may be used in the preparation of the oligomer compositions. In the case of aromatic diamines, suitable liquids include halogenated alkanes such as methylene chloride and chloroform; aprotic polar solvents such as dimethylformamide, dimethylacetamide and dimethyl sulfoxide; aromatic hydrocarbons and chlorinated aromatic hydrocarbons such as toluene, xylene and chlorobenzene; and ethers such as tetrahydrofuran and ethylene glycol dimethyl ether. In most instances, relatively volatile solvents such as methylene chloride, chloroform and tetrahydrofuran are preferred by reason of the ease of removal thereof by evaporation following completion of the reaction.

In this process of preparation, the acid chloride is gradually added to a solution of the diamine in the organic liquid. It is also most often added in the form of a solution in said liquid. The reagents are employed in molar ratios in the range of about 0.8–1.25:1 and preferably about 0.95–1.05:1.

In one embodiment of the invention, the diamine is initially present in the reaction vessel. Its concentration should then be up to about 0.03 M to optimize the yield of cyclics. A second embodiment is to introduce both reagents simultaneously to said organic liquid, whereupon the diamine is ordinarily also added as a solution.

It is sometimes advantageous to employ a hydrogen chloride acceptor in the reaction. Suitable hydrogen chloride acceptors are moderately strong bases such as alkali metal carbonates and tertiary amines, preferably sodium carbonate, triethylamine and pyridine. Said acceptor is generally present with the diamine, being either in the reaction vessel originally or introduced simultaneously with the acid chloride. The proportion thereof is preferably at least stoichiometric, most often about 1–3 equivalents per calculated equivalent of hydrogen chloride evolved.

Any reaction temperature effective to achieve reaction of the diamine with the dicarboxylic acid chloride may be employed. Elevated temperatures, such as in the range of about 35°–100° C., are usually satisfactory, with about 40°–80° C. being preferred.

The above-described macrocyclic polyamide oligomer compositions may also contain linear oligomers and high polymer (i.e., linear polyamides having a degree of polymerization greater than about 20). Any high polymer can typically be removed by conventional means such as flash chromatography on silica gel. When employing isophthaloyl dichloride and the bis-aminophenoxy ethers of this invention, cyclics yields of 90% or greater are typical.

The preparation of macrocyclic polyamide oligomer compositions is illustrated by the following examples.

EXAMPLE 6

A reaction vessel fitted with a septum cap, a reflux condenser and nitrogen purge means was charged with 5 ml. of chloroform which was brought to reflux in a nitrogen atmosphere. There were simultaneously added over ½ hour, via two syringes, a solution of 505.4 mg. (1.03 mmol.) of the diamine of Example 2 and 213 mg. (2.11 mmol.) of triethylamine in 5 ml. of dry tetrahydrofuran, and a solution of 209 mg. (1.03 mmol.) of isophthaloyl chloride in 5 ml. of dry chloroform. Refluxing was continued for 5 minutes, after which the mixture was diluted with 50 ml. of chloroform, washed with dilute aqueous hydrochloric acid solution and with sodium chloride solution, filtered through phase separation paper and vacuum stripped, yielding 520 mg. (80% of theoretical) of the desired cyclic polyamide oligomer mixture, m.p. 245°–285° C. It was shown by high pressure liquid chromatography to contain macrocyclic oligomers with degrees of polymerization up to about 15, with monomer to hexamer species being present in the approximate ratios 78:28:8:4:2:1. The presence of the monomer and dimer was confirmed by field desorption mass spectrometry.

The cyclic monomer species was isolated by preparative scale high pressure liquid chromatography. Its identity was also confirmed by field desorption mass spectrometry.

EXAMPLE 7

A reaction system similar to that of Example 6 was charged with 62 ml. of chloroform which was brought to reflux in a nitrogen atmosphere. There were simultaneously added over 40 minutes a solution of 1 gram (2.04 mmol.) of the diamine of Example 4 and 490 mg. (4.85 mmol.) of triethylamine in 10 ml. of dry tetrahydrofuran, and a solution of 500 mg. (3.46 mmol.) of isophthaloyl chloride in 10 ml. of dry chloroform. Refluxing was continued for 15 minutes, after which the mixture was diluted with methylene chloride, washed with dilute aqueous hydrochloric acid solution and vacuum stripped, yielding 1.33 grams of the desired macrocyclic polyamide oligomer mixture. It was shown by high pressure liquid chromatography to contain monomer to heptamer species in the approximate ratios 18.9:5.6:1.2:1.6:1.3:0.9:1.

EXAMPLE 8

A solution of 1 gram (2 mmol.) of the diamine of Example 2 and 410 mg. (4 mmol.) of triethylamine in 36 ml. of dry tetrahydrofuran was heated to reflux and a solution of 410 mg. (2 mmol.) of isophthaloyl chloride in 5 ml. of chloroform was added over ½ hour Upon workup as in Example 20, there was obtained a product shown by high pressure liquid chromatography to contain over 90% macrocyclic polyamide oligomers, with monomer to octamer species being present in the approximate ratios 18.4:7.9:4.5:2.9:2.0:1.6:1.2:1.

EXAMPLE 9

Following the procedure of Example 8, a solution of 2 mmol. of isophthaloyl chloride in 5 ml. of chloroform was added to a mixture of 2 mmol. of the diamine of Example 2, 650 mg. (6 mmol.) of sodium carbonate and 200 ml. of dry chloroform. Upon workup, there was obtained 1.2 grams of a tan solid containing about 90% macrocyclics, with monomer to hexamer species being present in the approximate ratios 11.0:3.6:2.3:1.4:1.2:1.

EXAMPLE 10

Following the procedure of Example 8, a solution of 2 mmol. of isophthaloyl chloride in 5 ml. of chloroform was added to a solution of 2 mmol. of the diamine of Example 2 in 77 ml. of dry chloroform, in the absence of hydrogen chloride acceptors. There was obtained 900 mg. of a yellow solid containing 90% macrocyclics, with monomer to hexamer species being present in the approximate ratios 16.2:3.1:1.7:1.0:1.1:1.

EXAMPLES 11–12

The procedure of Example 8 was repeated substituting 4,4'-biphenyldicarboxylic acid chloride and 1,1,3-trimethyl-3-phenylindane-4',6-dicarboxylic acid chloride, respectively, for isophthaloyl chloride on an equimolar basis. The products were shown to contain the following approximate ratios of molecular species:
Example 11—monomer to decamer, 7.4:7.3:4.4:3.1:2.3:2.1:1.6:1.4:1.2:1.
Example 12—monomer to heptamer, 4.4:5.2:11.3:6.3:3.3:1.7:1.

EXAMPLE 13

To a reaction vessel containing 12 ml. of dry methylene chloride at reflux temperature were added over ½ hour under nitrogen, with stirring, a solution of 200 mg. (0.65 mmol.) of 6,6'-diamino-3,3',3',3'-tetramethyl-1,1'-spiroindane and 132 mg. (1.3 mmol.) of triethylamine in 4 ml. of methylene chloride, and a solution of 133 mg. (0.65 mmol.) of isophthaloyl chloride in 4 ml. of methylene chloride. The mixture was cooled to room temperature, diluted with 50 ml. of methylene chloride, washed twice with dilute aqueous hydrochloric acid solution and once with aqueous sodium chloride solution, dried over magnesium sulfate and vacuum stripped. There was obtained 270 mg. of a white solid which was shown by high pressure liquid chromatography and field desorption mass spectroscopy to contain approximately 50% macrocyclic polyamide oligomers, with the balance being linear oligomers and high polymer.

EXAMPLE 14

A reaction vessel fitted with a septum cap, a magnetic stirrer, a reflux condenser and nitrogen purge means was charged with a solution of 840 mg. (1.71 mmol.) of the diamine of Example 2 and 270 mg. (3.42 mmol.) of pyridine in 20 ml. of chloroform which was brought to reflux in a nitrogen atmosphere. There was added over one hour, via a syringe, a solution of 1 gram (1.71 mmol.) of the diacid chloride of 6,6'-dicarboxy-3,3,3',3'-tetramethyl-1,1'-spiro(bis)indane in 14 ml. of dry chloroform. Refluxing was continued for 15 minutes, after which the mixture was diluted with 100 ml. of chloroform, washed with dilute aqueous hydrochloric acid solution and with sodium chloride solution, dried over magnesium sulfate, filtered and vacuum stripped, yielding 850 mg. of the desired macrocyclic polyamide oligomer mixture.

Examples 15–17

Following the procedure of Example 7, various diamines were reacted with equimolar proportions of the diacid chloride of 6,6'-dicarboxy-3,3,3',3'-tetramethyl-1,1'-spiro(bis)indane. After washing, the organic phases were dried over magnesium sulfate, filtered and vacuum stripped. The products were shown by high pressure liquid chromatography and field desorption mass spectrometry to comprise macrocyclic amide oligomers having degrees of polymerization from 1 to 3. The diamines employed were:
Example 15—m-phenylenediamine;
Example 16—4-aminophenyl ether;
Example 17—2,2-bis(4-aminophenyl)propane.

EXAMPLE 18

To a solution of 1.03 grams (4.54 mmol.) of 3,3'-diaminobenzanilide and 15 mg. of sodium pyrophosphate in 280 ml. of o-dichlorobenzene was added under reflux over ½ hour, with stirring, a solution of 2.72 grams (4.54 mmol.) of the dianhydride of Example 5 in 30 ml. of warm o-dichlorobenzene. Refluxing was continued for 2 hours, after which the water and solvent were removed by distillation to a total of 180 ml. The solution was cooled and poured into 500 ml. of rapidly stirred methanol. The solids which precipitated were extracted in a Soxhlet extractor with acetone. The residue from the extraction was a linear polyamideimide. Upon evaporation of the acetone from the extracts, there was obtained a white powder which was shown by field desorption mass spectrometry to comprise principally the macrocyclic polyamideimide dimer. The yield was about 70% of theoretical.

EXAMPLE 19

To a solution of 1 gram (2.04 mmol.) of trimellitic anhydride acid chloride and 15 mg. of sodium pyrophosphate in 2 ml. of o-dichlorobenzene was added slowly at 100° C., with stirring, a solution of 430 mg. (2.04 mmol.) of the diamine of Example 2 in 1 ml. of o-dichlorobenzene. The mixture was heated at 180° C. for 1 hour and 5 ml. of o-dichlorobenzene was added. Water and solvent were removed by distillation to a total of 5 ml., after which o-dichlorobenzene addition and distillation were repeated. The solution was cooled and poured into 50 ml. of rapidly stirred methanol. The solids which precipitated were filtered to yield 1.2 grams (91% of theoretical) of a material which was shown by high pressure liquid chromatography and field desorption mass spectrometry to comprise principally the macrocyclic polyamideimide dimer.

The basic reagents which may be employed in the method of this invention include inorganic bases such as the alkali and alkaline earth metals and their hydrides, hydroxides, carbonates and alkoxides, and strong organic bases such as tetraalkylammonium hydroxides, guanidines, and organometallics including Grignard reagents and organolithium reagents. The alkali metal hydrides, especially sodium hydride, are preferred.

The reaction between the lactam, basic reagent and macrocyclic polyamide oligomer composition typically takes place at elevated temperatures. In general, temperatures in the range of about 25°-200° C., preferably about 90°-150° C., are adequate to effect reaction of the lactam with the basic reagent to form an anionic intermediate, which subsequently reacts with the oligomer composition at temperatures in the range of about 200°-300° C. The proportions of lactam and oligomer composition are not critical but may be varied according to the desired stoichiometry of the product.

The preparation of the linear copolyamides of this invention is illustrated by the following examples.

EXAMPLE 20

A mixture of 7.5 grams of a macrocyclic polyamide oligomer mixture similar to that of Example 6, 7.5 grams of caprolactam and 237 mg. (15 mole percent based on caprolactam) of sodium hydride was heated in a test tube at 140° C. in a nitrogen atmosphere for 1 hour, during which time melting occurred and hydrogen was evolved. It was then heated for 10 minutes at 265° C. and cooled. The solid product was removed by breaking the test tube and a portion thereof was dissolved in chloroform and treated with trifluoroacetic anhydride, whereupon the polymer dissolved. Gel permeation chromatographic analysis of the solution showed the presence of a copolyamide having a number average molecular weight of 22,000 and a weight average molecular weight of 47,000.

EXAMPLE 21

A mixture of 1 gram of the crude macrocyclic polyamideimide oligomer mixture of Example 18, 10 grams of caprolactam and 290 mg. of sodium hydride was heated in a test tube at 150° C. in a nitrogen atmosphere for ½ hour, during which time melting occurred and hydrogen evolved. It was then heated for 12 minutes at 230° C. and cooled. The solid product was extracted with tetrahydrofuran, leaving as the insoluble product a linear copolyamide having a weight average molecular weight of 27,000.

What is claimed is:
1. A linear spirobiindane copolyamide comprising structural units of the formula

wherein $R^1$ is an alkylene radical containing a chain of about 2-20 carbon atoms, and spiro(bis)indane amide structural units of the formula

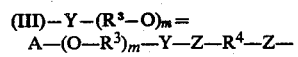

wherein:
A is

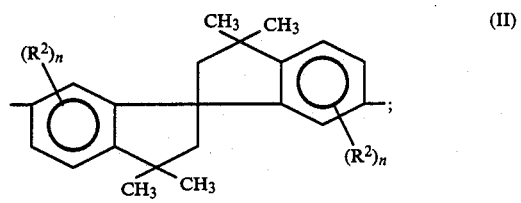

each $R^2$ is independently $C_{1-4}$ primary or secondary alkyl or halo;
each of $R^3$ and $R^4$ is independently an unsubstituted or substituted alkylene or arylene radical other than o-arylene;
Y is

and Z is NH, or Y is NH and Z is

m is 0 or 1; and
n is 0-3.
2. A copolyamide according to claim 1 wherein n is 0.
3. A copolyamide according to claim 2 wherein Y is NH; Z is

and $R^4$ is A, m-phenylene, 4,4'-biphenylene or

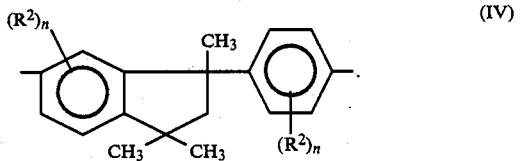

4. A copolyamide according to claim 3 wherein $R^3$ is m- or p-phenylene and m is 1.

5. A copolyamide according to claim 4 wherein $R^4$ is m-phenylene.

6. A copolyamide according to claim 5 wherein $R^1$ is $(CH_2)_5$.

7. A copolyamide according to claim 3 wherein m is 0 and $R^4$ is m-phenylene.

8. A copolyamide according to claim 7 wherein $R^1$ is $(CH_2)_5$.

9. A copolyamide according to claim 2 wherein Y is

Z is NH, $R^4$ is m- or p-phenylene and m is 0.

10. A copolyamide according to claim 9 wherein $R^4$ is m-phenylene.

11. A copolyamide according to claim 10 wherein $R^1$ is $(CH_2)_5$.

12. A method for preparing a copolyamide according to claim 1 which comprises effecting reaction between at least one lactam of the formula

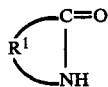 (V)

and a composition comprising macrocyclic polyamide oligomers of the formula

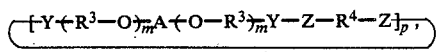 (VI)

wherein p is from 1 to about 15, in the presence of a basic reagent.

13. A method according to claim 12 wherein the basic reagent is an alkali metal hydride.

14. A method according to claim 13 wherein the reaction temperature is in the range of about 90°–300° C.

15. A method according to claim 13 wherein $R^1$ is $(CH_2)_5$.

16. A method according to claim 15 wherein Y is NH, Z is

$R^3$ is m- or p-phenylene, $R^4$ is m-phenylene and m is 1.

17. A method according to claim 15 wherein Y is NH, Z is

$R^4$ is m-phenylene and m is 0.

18. A method according to claim 15 wherein Y is

Z is NH, $R^4$ is m--phenylene and m is 0.

* * * * *